Figure 4:
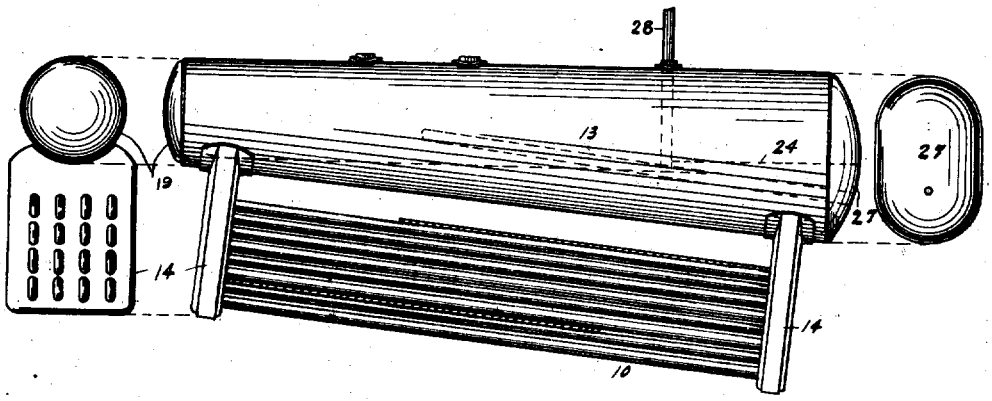

No. 12,052. Reissued Nov. 4, 1902.
H. L. WILSON.
STEAM BOILER.
(Application filed Mar. 10, 1902.)
2 Sheets—Sheet 1.
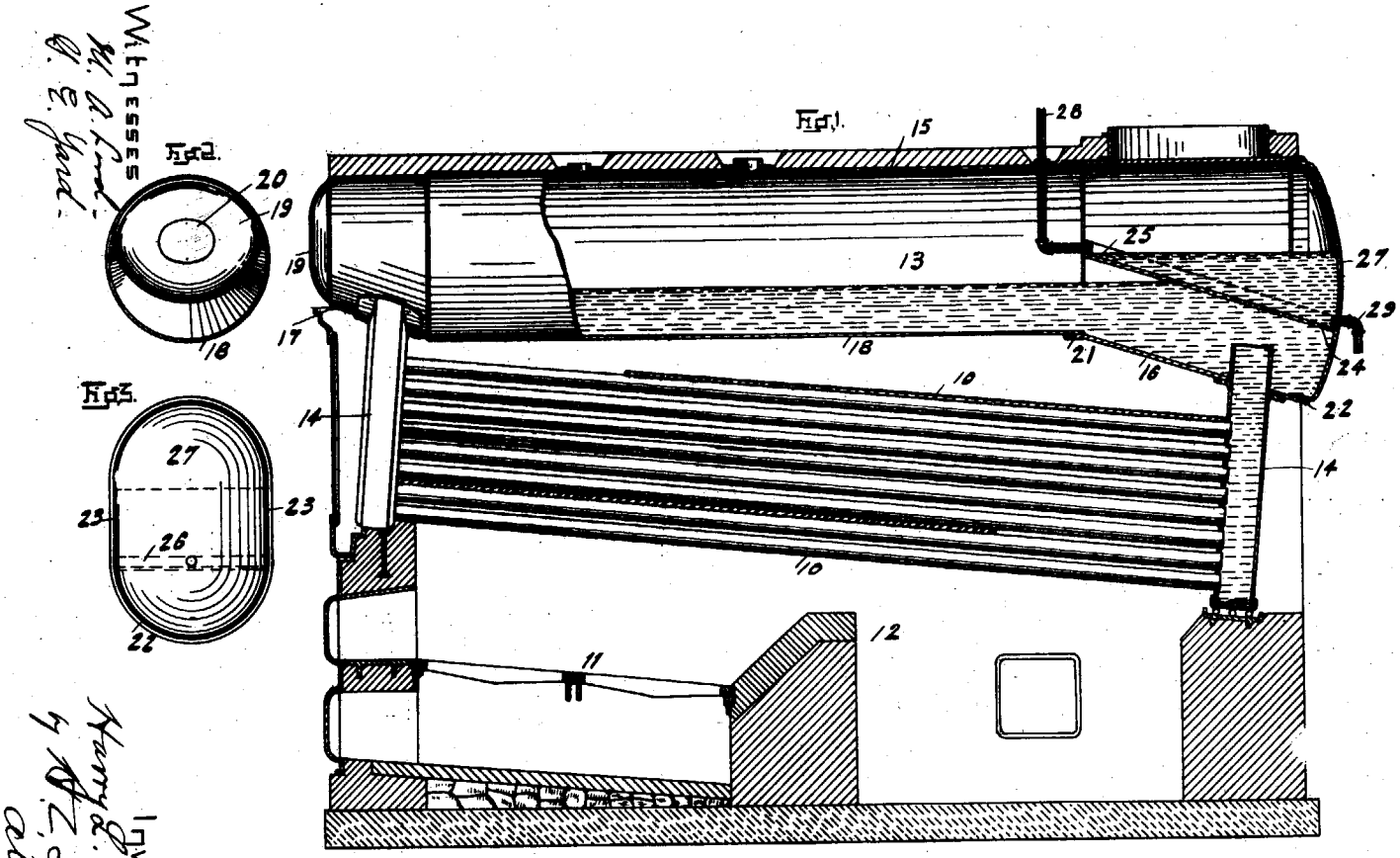
Witnesses
M. A. Lind
G. E. Yard
Inventor
Harry L. Wilson
by H. Z. Lind
atty No. 12,052.

Reissued Nov. 4, 1902.

H. L. WILSON.

STEAM BOILER.

(Application filed Mar. 10, 1902.)

2 Sheets—Sheet 2.

Witnesses

M. A. Lord.

G. E. Yard.

Inventor

Harry L. Wilson by H. C. Lord his Atty.

UNITED STATES PATENT OFFICE.

HARRY L. WILSON, OF ERIE, PENNSYLVANIA, ASSIGNOR TO THE ERIE CITY IRON WORKS, OF ERIE, PENNSYLVANIA.

STEAM-BOILER.

SPECIFICATION forming part of Reissued Letters Patent No. 12,052, dated November 4, 1902.

Original No. 685,418, dated October 29, 1901. Application for reissue filed March 10, 1902. Serial No. 97,677.

DIVISION A.

*To all whom it may concern:*

Be it known that I, HARRY L. WILSON, a citizen of the United States, residing at Erie, in the county of Erie and State of Pennsylvania, have invented a certain new and useful Steam-Boiler, of which the following is a specification, reference being had therein to the accompanying drawings.

This invention relates to steam-boilers; and the improvements contemplated in the invention are specially designed with reference to water-tube boilers in which a continuous circulation is afforded between a series of water-tubes and a superimposed drum, which tubes and drum are connected at their opposite ends by means of head-sections or water-legs.

The chief aim of the present invention is to promote the circulation of the water in and through the different portions of the boiler, thereby effecting a more rapid and thorough generation of steam and increasing the efficiency of the boiler.

Another object of the invention is to simplify the form of joint between the drum and head-sections. This is obtained by inclining that part of the bottom of the drum to which the head-section is attached so that the head-sections, which are at right angles to inclined water-tubes and so inclined, may form a connection with the drum at better angle than would be the case if that part of the drum at which the connection is made were not inclined. Incident to the construction there is also the possibility of making the head-sections of equal length, thus cheapening the construction and aiding the circulation by reason of the shortening of one of the sections.

A further object of the invention is to associate with the feed-water pipe a settling-pan, which is arranged partially within the steam-space and partially within the water-space of the drum, the pan being so disposed as to contain a large quantity of water, which is subjected to the action of the steam and brought nearly or quite to the point of ebullition, thereby effecting the deposit of a large amount of solid matter held in suspension, which matter may be afterward readily blown off.

With the above and other objects in view, the nature of which will appear as the description proceeds, the invention consists in the novel construction, combination, and arrangement of parts hereinafter fully described, illustrated, and claimed.

Figure 5:
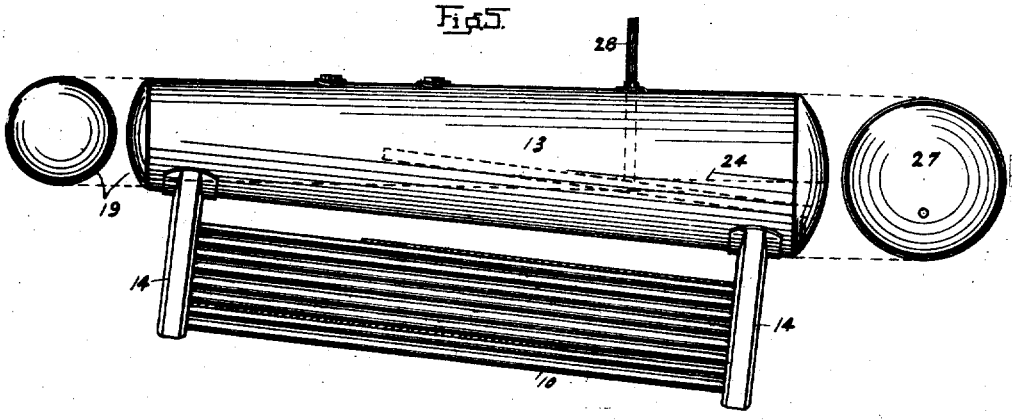

In the accompanying drawings, Figure 1 is a vertical longitudinal section through a water-tube boiler, illustrating the principles of this invention. Fig. 2 is a front end view of the drum. Fig. 3 is a rear end view of the same. Fig. 4 is a side elevation of a modified form of drum, involving, however, the same principle illustrated in Fig. 1, the said Fig. 4 also illustrating end elevations of the different ends of the boiler. Fig. 5 is an elevation similar to Fig. 4 with detached end elevations, showing the shape or formation of the ends of the drum.

Similar numerals of reference designate corresponding parts in all the figures of the drawings.

The boiler for the most part is of the construction now in common use and comprises a series of water-tubes 10, arranged over the fire-pot 11 and bridge-wall 12, a drum 13, superposed above the water-tubes 10, and head-sections 14, which are associated with the extremities of the water-tubes and also with the opposite end portions of the boiler. The drum, water-tubes, and head-sections are designed to be built into and supported upon suitable masonry in the usual manner; but as these details of construction and arrangement of the usual parts of the boiler and settings do not enter into this invention it is not thought necessary to go into any further description of the same.

The present invention resides principally in the drum and its parts and the relation of the drum to the water-tubes and head-section thereof. In carrying out the present invention the drum is constructed, substantially, with a straight and normally horizontal top 15 and an inclined bottom 16 17. Under the preferred embodiment of this invention a portion of the drum, and preferably the central portion thereof, is in the form of a true cylinder, the lower wall or bottom thereof being parallel with the top 15. The front end portion of the drum is reduced in size or constructed to form the inclined bottom wall 17. This is accomplished without reducing the drum in width, and as a result an ellipsoidal form is imparted to the front end of the drum, as shown in Fig. 2 and designated at 19, 20, representing the usual hand-hole. The rear end portion of the drum is enlarged or expanded from the point 21 rearward. This enlargement of the rear end of the drum is effected by dropping or inclining downward the bottom wall 16, and as a result an ellipsoidal shape is given to the rear end of the drum, as illustrated in Fig. 3 and represented at 22. In thus enlarging the rear end of the drum the opposite sides of such enlarged portion are flat, as indicated at 23, and parallel to each other, and it is within this space that the settling or separating pan 24 is placed. The settling or separating pan consists of a piece of sheet metal extending horizontally across the enlarged rear end of the drum and inclining longitudinally thereof, the said pan being provided at opposite sides with flanges 25, secured tightly to the parallel flat sides 23, and also having an end flange, (indicated at 26 by dotted lines in Fig. 3,) which is riveted or otherwise firmly secured to the rear end 27 of the drum. If necessary, the joint between the settling-pan and sides and end of the drum are calked. By reference to Fig. 1 it will be seen that a portion of the settling-pan lies within the steam-space of the boiler, while the remainder lies within the water-space, the normal level of the water being about one-third the depth of the drum.

28 designates the feed-water pipe, the inner end of which overhangs the settling-pan, so as to deliver the feed-water thereon, and 29 represents the blow-off pipe, which communicates with the lowest portion of the space above the settling-pan. The blow-off pipe is of course designed to be equipped with a valve, so that the sediment can be blown off at any time desired.

Figs. 2 and 3 show that the front end of the drum is in the shape of an ellipse, the major axis of which extends horizontally, and the rear end of the drum in the form of a flat-sided ellipse, the major axis of which extends vertically.

Instead of constructing the drum with a cylindrical intermediate portion said drum may be made of a regular taper from one end to the other, as shown in Figs. 4 and 5, and, if desired, the front end of the drum may be circular, as shown in said figures, while the rear end of the drum may be in the form of a vertical flat-sided ellipse, as shown in Fig. 4, or of circular formation, as shown in Fig. 5. Under either arrangement or construction it will be seen that it is practicable to construct the water-legs or head-sections 14 of equal length vertically, and by thus making the rear head-section shorter and, if possible, of the same length as the forward head-section the cost of the manufacture is materially reduced and a considerable saving in material also effected. It will be noted also that the inclined bottom also presents a better angle to the inclined sections for forming the joints between them. By providing the drum with an inclined bottom and a horizontal top the thorough circulation of the water is aided and at the same time the steam-space within the drum is materially increased, the water-space of the drum occupying only about one-third of the internal area thereof. The construction and arrangement of the inclined settling or separating pan accomplishes two important results: First, the pan is adapted to hold a large amount of water and the latter becomes heated almost to the steam temperature, causing it to deposit a large amount of the solid matter held in suspension and rendering it impossible for such solid matter to enter into the circulation, this sediment being easily blown off periodically through the blow-off pipe above mentioned; second, the pan by being riveted or securely fastened to the sides of the drum strengthens the oppositely-located flat sides of such drum and renders the shell of the drum as strong as if it were in the form of a true cylinder, and, third, the pan being located over or near the downtake-section the water delivered does not interfere with the free ebullition of steam at the uptake.

I am aware that prior to this invention boilers have been devised embodying cylindrical drums arranged at an inclination; but these boilers were open to serious and almost fatal objection in that on account of the inclination of the cylindrical drum the water-space occupied fully three-fifths of the internal area of the drum, thus leaving but a comparatively small steam-space and causing the steam to give off water. Such boilers have demonstrated the fact that the circulation is materially increased. By my invention I obtain the advantage of the increased circulation without sacrificing any of the steam-space.

It will of course be understood that the pitch of the bottom of the drum may be varied, that the cylindrical intermediate portion of the drum may be made of any desired length according to the size of the boiler, and that the end portions of the drum may be enlarged or contracted and fashioned into various cross-sectional shapes. Such changes as these, together with other modifications in the form, proportion, and minor details of construction, may be resorted to without departing from the principles of this invention.

It will be noted that the drum in the preferred construction is of uniform width. By so constructing the drum the inclosing walls of the boiler may be made parallel, thus simplifying their construction.

What I claim as new is—

1. In a steam-boiler, the combination of a drum having an enlarged portion with its bottom inclined to its top, said enlarged portion being of uniform width; and a head-section connected to the bottom of said enlarged portion.

2. In a steam-boiler, the combination of a drum having an enlarged portion, with its bottom inclined to its top, said enlarged portion being of uniform width; and a head-section connected to the bottom of said enlarged portion, said head-section being inclined to the top of said enlarged portion toward a right angle to the bottom of said portion.

3. In a steam-boiler, the combination of a steam-drum having a reduced portion with its bottom inclined to its top, said reduced portion being of uniform width; and a head-section connected to the bottom of said reduced portion.

4. In a steam-boiler, the combination of a steam-drum having a reduced portion with its bottom inclined to its top, said reduced portion being of uniform width; and a head-section connected to the bottom of said reduced portion, said head-section being inclined to the top of said reduced portion toward a right angle to the bottom of said portion.

5. In a steam-boiler, the combination of a drum having a cylindrical intermediate portion and end portions having bottoms inclined to their tops; head-sections connected with said drum along said inclined bottoms, said head-sections being inclined to the top of the drum in the direction of a right angle to the inclined bottoms; and water-tubes connecting said head-sections and arranged at right angles thereto.

6. In a steam-boiler, the combination of a drum of uniform width having a cylindrical intermediate portion and end portions having bottoms inclined to their tops; head-sections connected with said drum along said inclined bottoms, said head-sections being inclined to the top of the drum in the direction of a right angle to the inclined bottoms; and water-tubes connecting said head-sections and arranged at right angles thereto.

7. In a steam-boiler, the combination of a horizontal drum of uniform width having portions of its body inclined to its top; head-sections connected with said drum along said inclined bottoms, said head-sections being inclined to the top of the drum in the direction of a right angle to the inclined bottoms; and water-tubes connecting said head-sections and arranged at right angles thereto.

8. In a steam-boiler, the combination of a drum having a horizontal, cylindrically-shaped intermediate portion and having end portions in which the bottoms are inclined to the top of the drum; head-sections connected with said drum along said inclined bottoms, said head-sections being inclined to the top of the drum in the direction of a right angle to the inclined bottoms; and water-tubes connecting said head-sections and arranged at right angles thereto.

9. In a steam-boiler, the combination of a drum of uniform width having a cylindrical intermediate portion and end portions the bottoms of which are inclined to the top of the drum; head-sections connected with said drum along said inclined bottoms, said head-sections being inclined to the top of the drum in the direction of a right angle to the inclined bottoms; and water-tubes connecting said head-sections and arranged at right angles thereto.

10. In a steam-boiler, the combination of a drum having a circular shape in cross-section, and ellipsoidal end portions, the bottoms of said end portions being inclined to the bottom of the part of the drum intermediate the ends; head-sections connected to the bottom of the ellipsoidal portion; and water-tubes in said head-sections extending from said head-sections at substantially right angles thereto.

11. In a steam-boiler, the combination of a drum, a portion of which is ellipsoidal at one end and circular at the other, the bottom being inclined to the top; and a head-section connected with the drum along the inclined bottom.

12. In steam-boilers, the combination with inclined sections and water-tubes connecting the same, of a drum connected with the head-sections, said drum having a circular shape in cross-section intermediate its ends, and an ellipsoidal end portion substantially as described.

13. In a steam-boiler, the combination with inclined head-sections; and water-tubes connecting the same and arranged at right angles to the head-sections; of a drum having a horizontally-arranged cylindrically-shaped portion intermediate its ends; and ellipsoidal end portions, the bottoms of which are inclined and to which the head-sections are attached.

14. In a steam-boiler, the combination of a drum, head-sections forming an uptake and downtake connected with said drum; water-tubes connecting said sections; and a settling-pan arranged partly in the steam-space and partly in the water-space and arranged to deliver water to the boiler from the top surface of the water in the pan and to a part of the drum adjacent to the downtake.

15. In steam-boilers, a drum having a circular cross-sectional shape intermediate its ends and expanded or enlarged at one end into the form of an ellipsoid with flat opposite sides; a settling-pan arranged in said enlarged space; a head-section connected with said enlarged space; and water-tubes connected with said head-sections.

16. In steam-boilers, a drum having a circular cross-sectional shape intermediate its ends and expanded or enlarged at one end into the form of an ellipsoid with flat opposite sides; a settling-pan having its side portions rigidly connected with said flat sides; a head-section connected with the bottom of said ellipsoid; and water-tubes connected with said head-section, substantially as described.

17. In a steam-boiler, a drum having an enlarged end embodying a downwardly-inclined bottom; a head-section connected with said inclined bottom; and water-tubes connected with said head-section; in combination with a settling-pan arranged in said enlarged portion.

18. In a steam-boiler, a drum having an enlarged end embodying a downwardly-inclined bottom; a head-section connected with said inclined bottom and forming a downtake; water-tubes connected with said head-section and with the drum at the opposite end; in combination with a settling-pan arranged partly in the steam-space and partly in the water-space and arranged to deliver water to the boiler from the top surface of the water in the pan, said pan being placed in the enlarged portion of the drum and arranged to deliver water to the drum adjacent to the downtake.

19. In steam-boilers, a drum having an enlarged rear end embodying a downwardly-inclined bottom, in combination with an inclined settling-pan arranged partly in the steam-space and partly in the water-space of the drum and secured rigidly to the opposite sides and adjacent end wall of the drum; a head-section connected with the inclined bottom; and water-tubes connected with the head-section, substantially as described.

20. In steam-boilers, a drum having a circular cross-sectional shape intermediate its ends and expanded or enlarged at one end into the form of an ellipsoid with flat opposite sides; a head-section connected with the bottom of said ellipsoid; and water-tubes connected with said head-section; in combination with an inclined settling-pan disposed in said enlarged end and arranged partly in the steam-space and partly in the water-space of the drum and secured rigidly to the sides and adjacent end wall of the drum.

21. In steam-boilers, a drum having one end thereof enlarged and embodying an inclined bottom, in combination with an inclined settling-pan having a portion thereof arranged in the steam-space and another portion in the water-space of the drum and secured rigidly to the opposite sides and end of the drum; a feed-water pipe arranged to discharge over the upper end of the settling-pan; and a blow-off pipe communicating with the space above the lower end of the settling-pan; a head-section connected with said inclined bottom; and water-tubes connected with said head-section, substantially as described.

22. In a steam-boiler, the combination of a drum having a horizontally-arranged cylindrically-shaped intermediate portion and ellipsoidal ends of the same width as the cylindrical intermediate portion, the tops of said ellipsoidal ends being in line with the top of the cylindrical portion and the bottoms of said ellipsoidal portions being inclined to said cylindrical portion, one of said ellipsoidal portions being an enlargement of the cylindrical portion; inclined head-sections connected with the bottoms of said ellipsoidal portions, the one connected with the enlargement forming a downtake; water-tubes connecting said head-sections and arranged at right angles to said head-sections; a settling-pan arranged in the ellipsoidal portion forming an enlargement and adjacent to the downtake, said settling-pan being secured to the sides of the ellipsoid and the end of the drum and disposed partly in the water-space and partly in the steam-space; a feed-water pipe arranged to discharge into said settling-pan; and a blow-off pipe communicating with the space at the bottom of the settling-pan.

23. In a steam-boiler, the combination of a drum having a portion of its bottom inclined to its top; two headers connected with said drum along said inclined portion, said headers being inclined to the top of the drum in the direction of a right angle to the inclined portions of the bottom, said headers being also of equal length; and water-tubes connecting said headers.

In testimony whereof I affix my signature in the presence of two witnesses.

HARRY L. WILSON.

Witnesses:
C. SMALLEY,
H. C. LORD.